(12) United States Patent
Sato et al.

(10) Patent No.: US 11,776,367 B2
(45) Date of Patent: Oct. 3, 2023

(54) TACTILE SENSATION PROVIDING APPARATUS, TACTILE SENSATION PROVIDING SYSTEM, CONTROL METHOD, AND NON-TRANSITORY RECORDING MEDIUM

(71) Applicant: ALPS ALPINE CO., LTD., Tokyo (JP)

(72) Inventors: Kunio Sato, Miyagi (JP); Toshihiko Saito, Miyagi (JP); Hajime Shikata, Miyagi (JP)

(73) Assignee: ALPS ALPINE CO., LTD., Tokyo (JP)

( * ) Notice: Subject to any disclaimer, the term of this patent is extended or adjusted under 35 U.S.C. 154(b) by 213 days.

(21) Appl. No.: 17/323,233

(22) Filed: May 18, 2021

(65) Prior Publication Data

US 2021/0272427 A1    Sep. 2, 2021

Related U.S. Application Data

(63) Continuation of application No. PCT/JP2019/042997, filed on Nov. 1, 2019.

(30) Foreign Application Priority Data

Dec. 12, 2018 (JP) ................. 2018-232906

(51) Int. Cl.
*G08B 6/00* (2006.01)
(52) U.S. Cl.
CPC ..................... *G08B 6/00* (2013.01)
(58) Field of Classification Search
CPC ........................................... G08B 6/00
USPC ...................................... 340/407.1
See application file for complete search history.

(56) References Cited

U.S. PATENT DOCUMENTS

| 5,747,914 | A | 5/1998 | Huang et al. |
| 10,109,163 | B2 * | 10/2018 | Li ............... G08B 6/00 |
| 2011/0204830 | A1 * | 8/2011 | Kim ......... H02P 25/032 |
| | | | 318/114 |
| 2012/0206247 | A1 | 8/2012 | Bhatia et al. |
| 2016/0144404 | A1 * | 5/2016 | Houston ........ H02K 33/00 |
| | | | 318/114 |
| 2018/0182212 | A1 * | 6/2018 | Li .................. G06F 3/016 |
| 2018/0335850 | A1 * | 11/2018 | Yamazaki ...... G06F 1/1684 |

(Continued)

FOREIGN PATENT DOCUMENTS

| JP | 2000-514250 | 10/2000 |
| JP | 2017-068874 | 4/2017 |
| JP | 2018-129049 | 8/2018 |

(Continued)

OTHER PUBLICATIONS

International Search Report for PCT/JP2019/042997 dated Dec. 10, 2019.

*Primary Examiner* — Jack K Wang
(74) *Attorney, Agent, or Firm* — IPUSA, PLLC

(57) ABSTRACT

A tactile sensation providing apparatus includes a linear resonant actuator; and circuitry configured to provide a pulse wave to the linear resonant actuator as a driving signal. The circuitry is further configured to, when a frequency of the pulse wave is smaller than a resonance frequency of the linear resonant actuator, set a pulse width of the pulse wave at a value smaller than a half of a reciprocal of the frequency of the pulse wave.

13 Claims, 9 Drawing Sheets

(56) References Cited

U.S. PATENT DOCUMENTS

2019/0039092 A1* 2/2019 Kim ................. G06F 3/016

FOREIGN PATENT DOCUMENTS

| JP | 2018-195124 | 12/2018 |
|----|-------------|---------|
| WO | 2017/188507 | 11/2017 |

* cited by examiner

TACTILE SENSATION PROVIDING APPARATUS, TACTILE SENSATION PROVIDING SYSTEM, CONTROL METHOD, AND NON-TRANSITORY RECORDING MEDIUM

CROSS-REFERENCE TO RELATED APPLICATION

The present application is a continuation filed under 35 U.S.C. 111 (a) claiming the benefit under 35 U.S.C. 120 and 365 (c) of PCT International Application No. PCT/JP2019/042997 filed on Nov. 1, 2019, and designating the U.S., which is based on and claims priority to Japanese Patent Application No. 2018-232906, filed Dec. 12, 2018. The entire contents of the foregoing applications are incorporated herein by reference.

BACKGROUND OF THE INVENTION

1. Field of the Invention

The present disclosure relates to a tactile sensation providing apparatus, a tactile sensation providing system, a control method, and a non-transitory recording medium.

2. Description of the Related Art

A tactile sensation providing apparatus, is known, which includes a linear resonant actuator (LRA). While various waveforms are known as waveforms of a LRA driving signal, a pulse wave is effective in downsizing the tactile sensation providing apparatus. For example, techniques concerning driving a tactile sensation providing apparatus have been proposed in Japanese Patent Documents 1-3.

CITATION LIST

Patent Documents

[Patent Document 1] Japanese Unexamined Patent Application Publication No. 2017-68874
[Patent Document 2] Japanese Unexamined Patent Application Publication No. 2018-129049
[Patent Document 3] Japanese Translation of PCT International Application Publication No. 2000-514250

SUMMARY OF THE INVENTION

Technical Problem

However, in a conventional tactile sensation providing apparatus using a pulse wave, tactile sensation likely includes noise when a frequency of vibration is low.

The present disclosure is intended to provide a tactile sensation providing apparatus, a tactile sensation providing system, a control method, and a program capable of reducing noise generated in tactile sensation even when a frequency of vibration is low.

Solution to Problem

According to the present disclosure, there is provided a tactile sensation providing apparatus that includes a linear resonant actuator and circuitry configured to provide a pulse wave as a driving signal to the linear resonant actuator. The circuitry is further configured to, when a frequency of the pulse wave is smaller than a resonance frequency of the linear resonant actuator, set a pulse width of the pulse wave at a value smaller than a half of a reciprocal of the frequency of the pulse wave.

Advantageous Effects of the Invention

According to the present disclosure, noise generated in tactile sensation can be reduced even when the frequency of vibration is low.

Other objects, features and advantages of the present invention will become more apparent from the following detailed description when read in conjunction with the accompanying drawings.

DETAILED DESCRIPTION OF THE PREFERRED EMBODIMENTS

Figure 1:
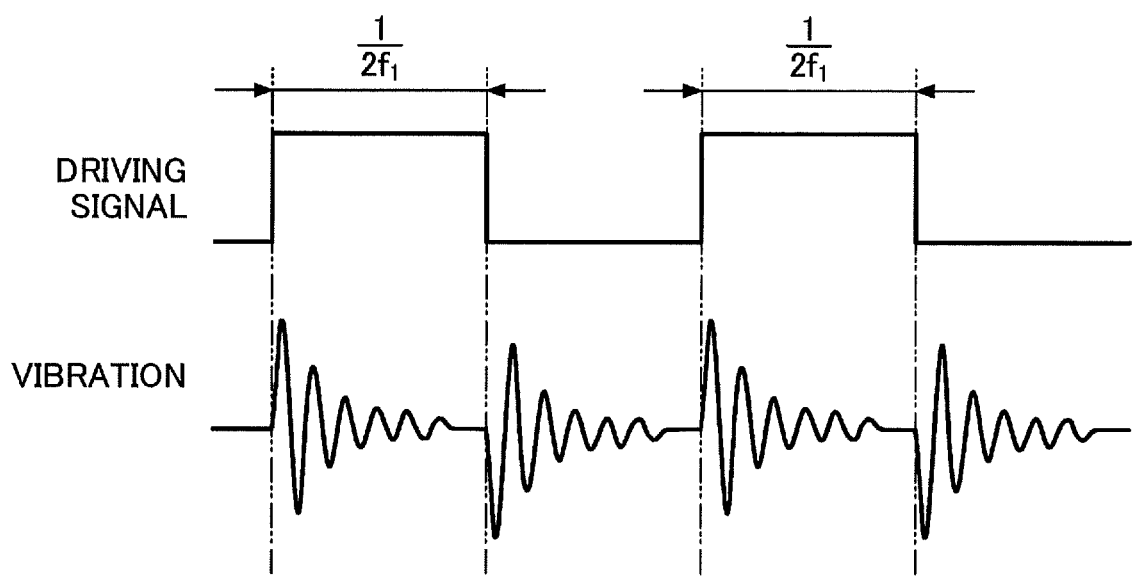
FIG. 1 is a diagram depicting vibration of a linear resonant actuator.

First, vibration characteristics of a linear resonant actuator (LRA) will be described. FIG. 1 is a diagram depicting vibration of a LRA. A LRA forms a spring mass system and has a resonance frequency $f_2$. Thus, when a pulse wave is provided, a LRA starts vibrating at a rise point of the pulse wave and continues to vibrate at the resonance frequency $f_2$ until the vibration converges. The LRA also starts vibrating at a fall point of a pulse wave and continues to vibrate at the resonance frequency $f_2$ until the vibration converges. When a frequency of a pulse wave is $f_1$, as depicted in FIG. 1, a pulse width of the pulse wave is a half of a reciprocal of the frequency $f_1$, and vibration starts at the resonance frequency $f_2$ at each rise point and each fall point.

However, when the frequency $f_1$ of the pulse wave is high and is higher than the resonance frequency $f_2$, vibration occurring at a fall point overlaps a first cycle of vibration occurring at a rise point, and thus, the vibration cannot be distinguished from each other. Thus, the LRA starts vibrating at the resonance frequency $f_2$ at each rise point of a pulse wave.

Thus, in a case where a pulse wave is used as a driving signal, when a frequency $f_1$ of the pulse wave is greater than or equal to the resonance frequency $f_2$ of the LRA, the LRA vibrates at the frequency $f_1$ of the pulse wave. On the other hand, when the frequency $f_1$ is smaller than the resonance frequency $f_2$, as described above, the LRA starts vibrating at a frequency twice the frequency of the pulse wave $f_1$. For example, when the frequency $f_1$ is 100 Hz and is smaller than the resonance frequency $f_2$, the LRA starts vibrating at a rate of 200 times per second. For this reason, noise is included in tactile sensation when a frequency of vibration is low.

The inventors of the present invention have devoted energetic efforts to remove such noise and have arrived at the embodiments of the present disclosure that will now be described.

Hereinafter, the embodiments of the present disclosure will be described in detail with reference to the accompanying drawings. In the present specification and the drawings, duplicate descriptions of elements having substantially the same functional configurations may be omitted by using of the same reference numerals.

First Embodiment

Figure 2:
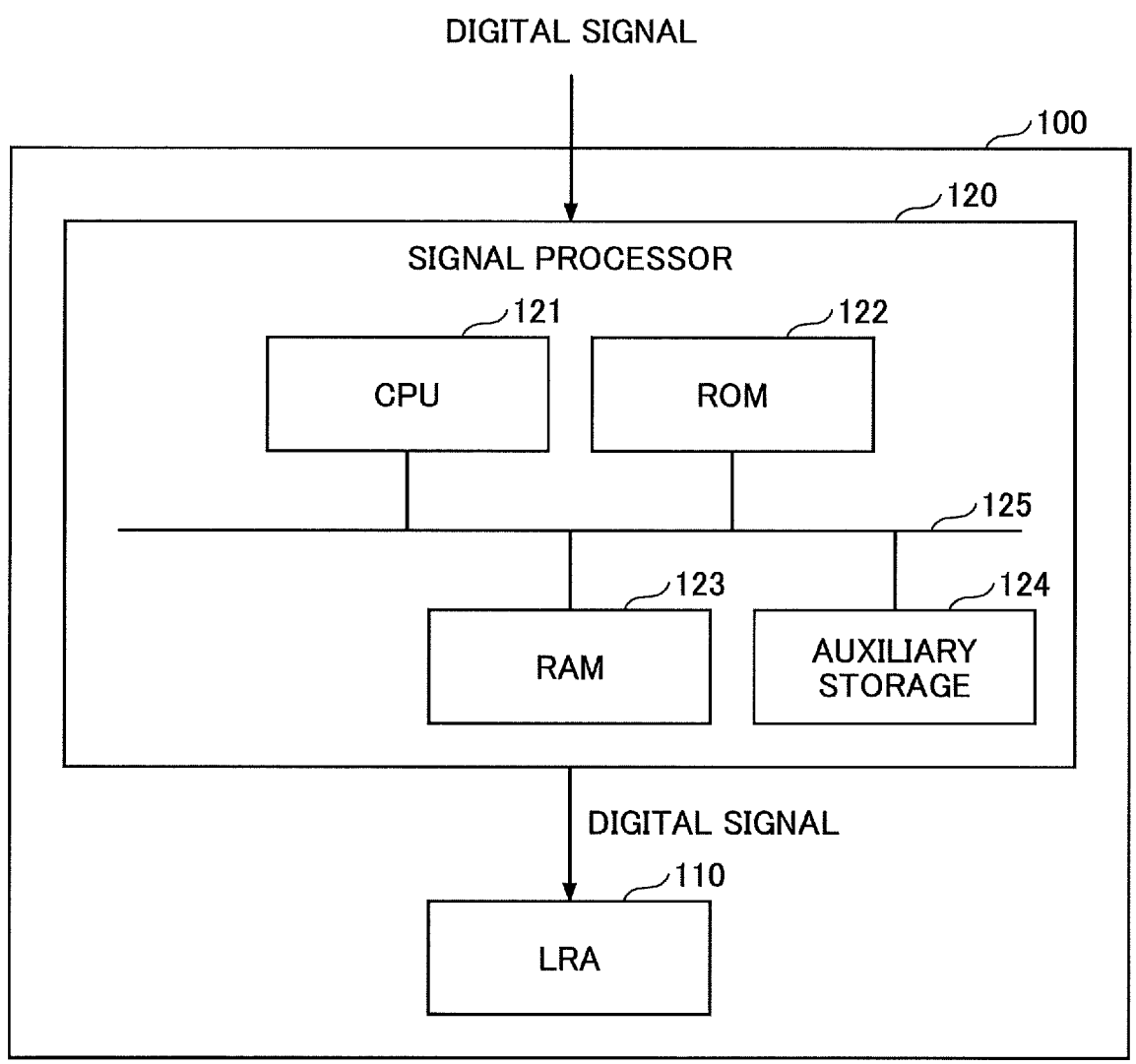
FIG. 2 is a block diagram depicting a tactile sensation providing apparatus according to a first embodiment.

A first embodiment relates to a tactile sensation providing apparatus using a digital signal as an input signal. FIG. 2 is a block diagram illustrating the tactile sensation providing apparatus according to the first embodiment.

As depicted in FIG. 2, the tactile sensation providing apparatus 100 according to the first embodiment includes a LRA 110 and a signal processor 120 that provides a pulse wave to the LRA 110 as a driving signal.

The signal processor 120 includes a central processing unit (CPU) 121, a read-only memory (ROM) 122, a random access memory (RAM) 123, and an auxiliary storage 124. The CPU 121, ROM 122, RAM 123, and auxiliary storage 124 form a so-called computer. These elements of the signal processor 120 are interconnected via a bus 125. The signal processor 120 is, for example, a semiconductor chip, and is an example of circuitry.

The CPU 121 executes various programs (for example, a frequency control program) stored in the auxiliary storage 124.

The ROM 122 is a non-volatile main storage device. The ROM 122 stores programs and data necessary for the CPU 121 to execute the various programs stored in the auxiliary storage 124. Specifically, the ROM 122 stores boot programs such as a basic input/output system (BIOS) and an extensible firmware interface (EFI), and so forth.

The RAM 123 is a volatile main storage device such as a dynamic random access memory (DRAM) or a static random access memory (SRAM). The RAM 123 functions as a work area for loading the various programs stored in the auxiliary storage 124 when the programs are executed by the CPU 121.

The auxiliary storage 124 is an auxiliary storage device that stores the various programs to be executed by the CPU 121 and various data generated when the various programs are executed by the CPU 121.

In the present embodiment, the signal processor 120 receives a digital signal (pulse wave) that can be used to drive the LRA 110 as an input signal.

Figure 3:
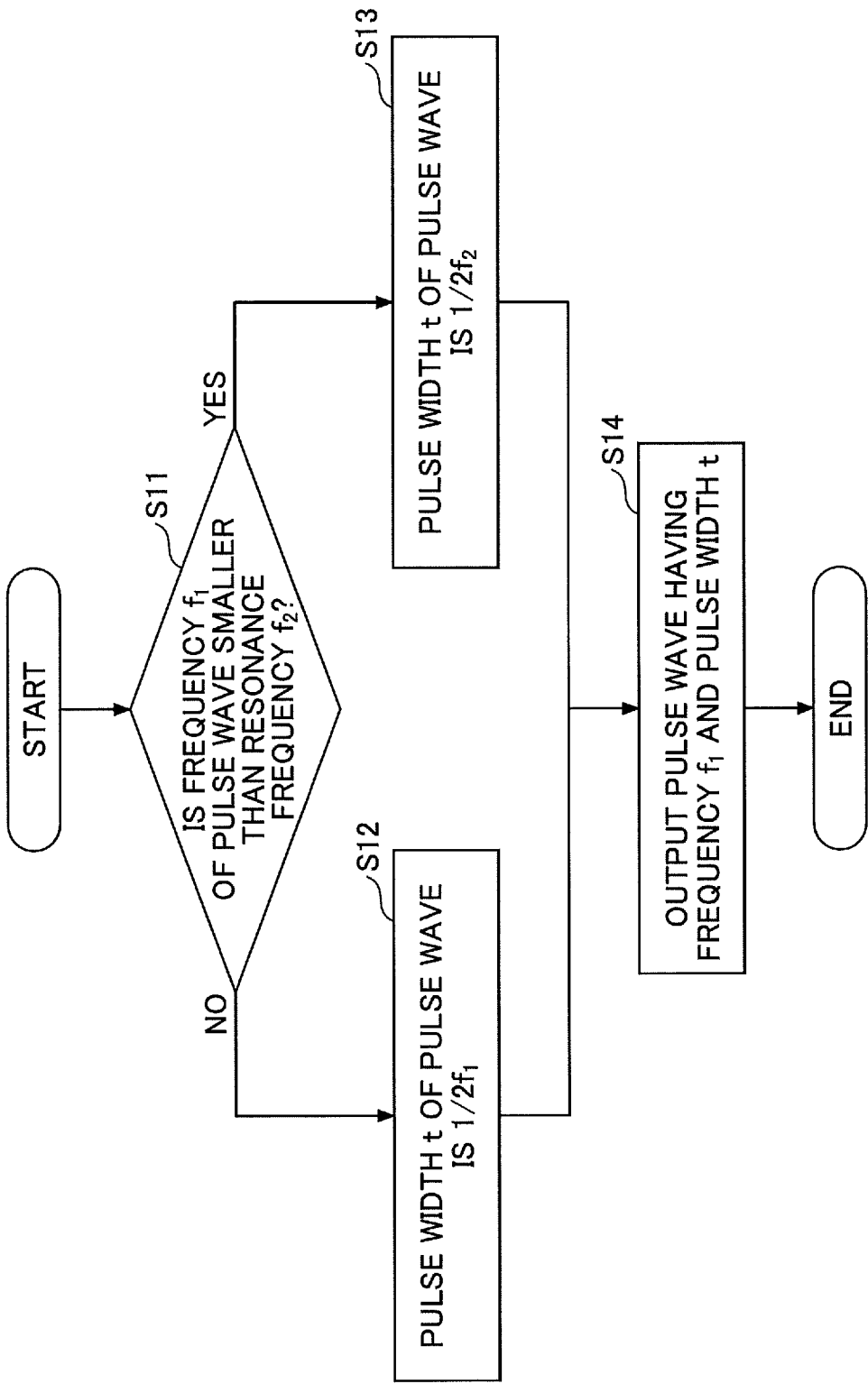
FIG. 3 is a flowchart illustrating an outline of processing by a signal processor according to the first embodiment.

The signal processor 120 has such a hardware configuration and performs the following processing. FIG. 3 is a flowchart illustrating an outline of processing performed by the signal processor 120.

First, in step S11, the signal processor 120 analyzes an input digital signal (pulse wave) to obtain a frequency $f_1$ of the input digital signal and determines whether the frequency $f_1$ is smaller than a resonance frequency $f_2$ of the LRA 110.

When the frequency $f_1$ is greater than or equal to the resonance frequency $f_2$ of the LRA 110, a pulse width t of the pulse wave is left unchanged from a half of the reciprocal of the frequency $f_1$, that is, is left unchanged from $½f_1$, in step S12. The duty ratio of the pulse wave is thus 50%.

On the other hand, when the frequency $f_1$ is smaller than the resonance frequency $f_2$ of the LRA 110, a pulse width t of the pulse wave is made to be a half of the reciprocal of the resonance frequency $f_2$, that is, is made to be $½f_2$, in step S13. The duty ratio of the pulse wave is thus smaller than 50%.

Then, after step S12 or S13, the pulse wave having the pulse width t set in step S12 or S13 is provided to the LRA 110 to drive the LRA 110.

In the tactile sensation providing apparatus 100, when a frequency $f_1$ of the pulse wave is greater than or equal to the resonance frequency $f_2$ of the LRA 110, as described above, a frequency of vibration of the LRA 110 is substantially equal to the frequency $f_1$. Thus, tactile sensation provided by vibration of the LRA 110 is not likely to include noise.

Figure 4:
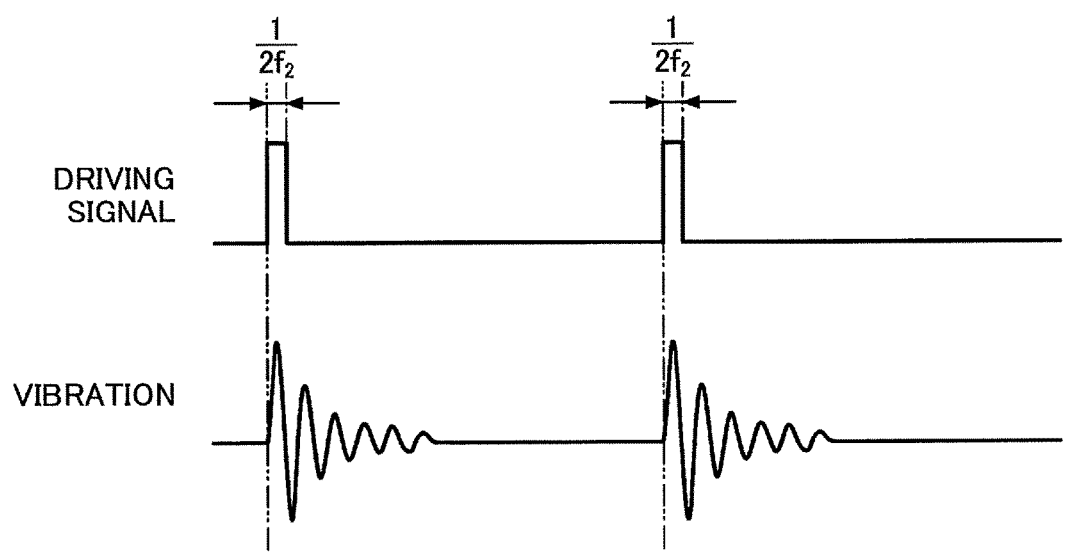
FIG. 4 depicts vibration where a frequency of a pulse wave is smaller than a resonance frequency of a linear resonant actuator according to the first embodiment.

When a frequency $f_1$ of the pulse wave is smaller than the resonance frequency $f_2$ of the LRA 110, a frequency of a pulse wave provided to the LRA 110 is left unchanged from the frequency $f_1$, and the pulse width t is $½f_2$, as depicted in FIG. 4. Therefore, a vibration occurring due to a fall of the pulse wave is continuous from a vibration occurring due to a rise of the pulse wave, and the frequency of the vibration of the LRA 110 is substantially equal to the frequency $f_1$. Thus, also in this case, tactile sensation provided by vibration of the LRA 110 is not likely to include noise.

Thus, according to the first embodiment, even when a frequency of vibration is low, noise generated in tactile sensation can be reduced.

Examples of the tactile sensation providing apparatus 100 using a digital signal as an input signal include an apparatus generating vibration based on digital data, such as a portable game machine or a smartphone.

Second Embodiment

Figure 5:
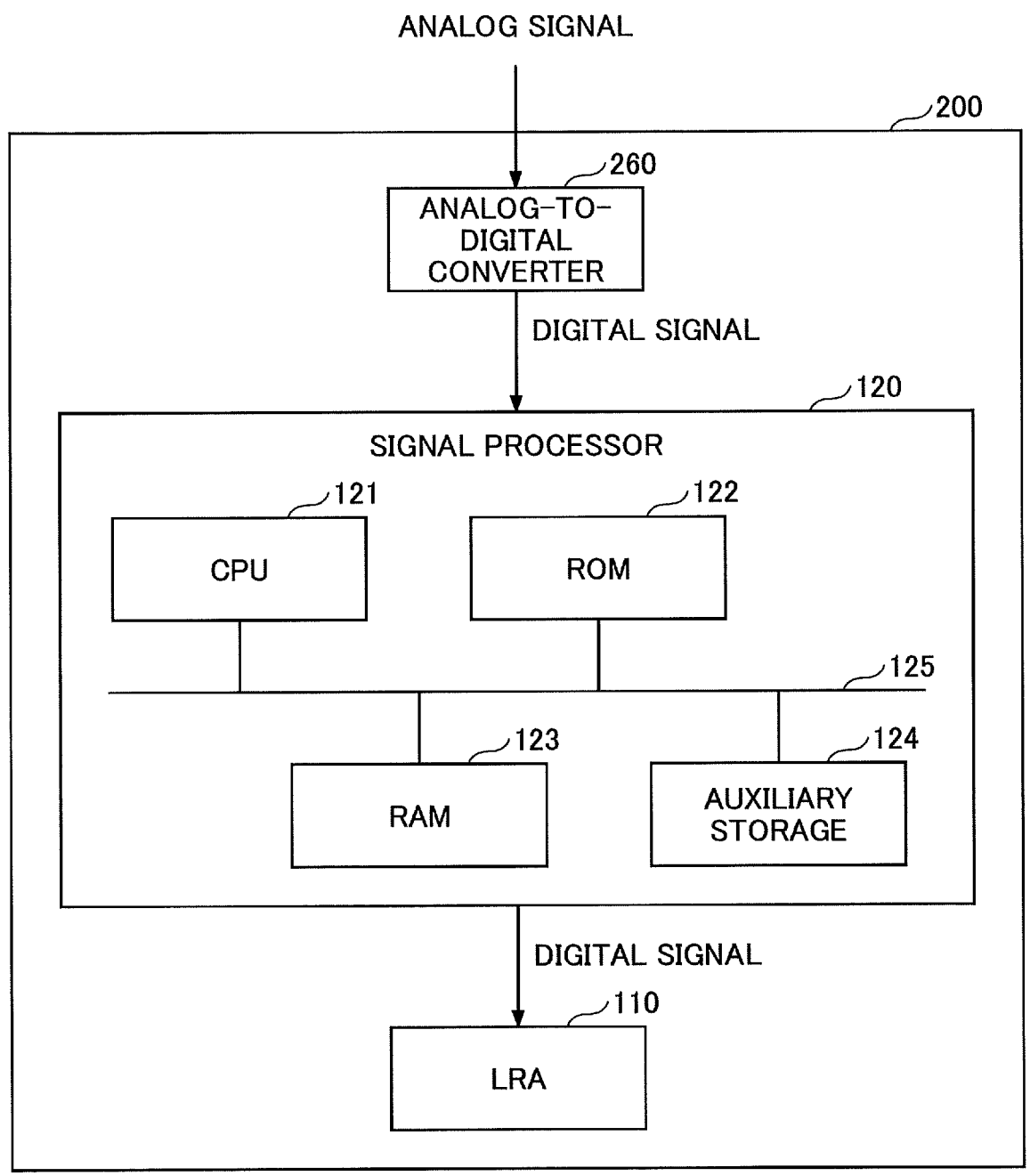
FIG. 5 is a block diagram depicting a tactile sensation providing apparatus according to a second embodiment.

A second embodiment relates to a tactile sensation providing apparatus using an analog signal as an input signal. FIG. 5 is a block diagram illustrating a tactile sensation providing apparatus according to the second embodiment.

As depicted in FIG. 5, the tactile sensation providing apparatus 200 according to the second embodiment includes a LRA 110, a signal processor 120, and an analog-to-digital (AD) converter 260.

In the present embodiment, an analog signal is input to the tactile sensation providing apparatus 200 as an input signal that cannot be used to drive the LRA 110 as it is. The AD converter 260 converts an analog signal input to the tactile sensation providing apparatus 200 into a digital signal (pulse wave) that can be used to drive the LRA 110 and outputs the digital signal to the signal processor 120.

Figure 6:
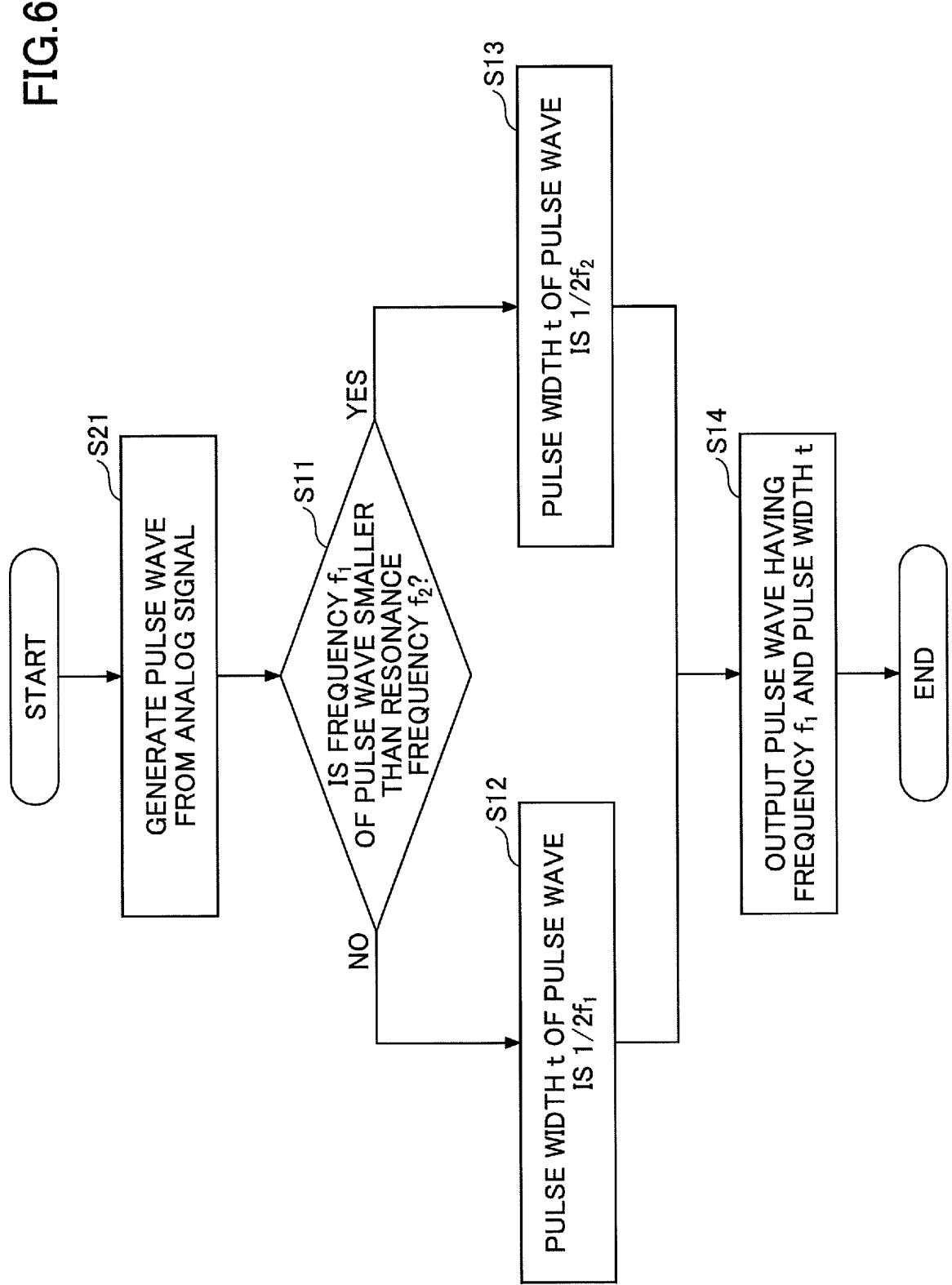
FIG. 6 is a flowchart illustrating an outline of processing by an analog-to-digital converter and a signal processor according to the second embodiment.

The AD converter 260 and the signal processor 120 have the above-described hardware configuration, and perform the following processing. FIG. 6 is a flowchart illustrating an outline of processing performed by the AD converter 260 and the signal processor 120.

First, in step S21, the AD converter 260 converts an input analog signal, for example, a sinusoidal signal, into a digital signal (pulse wave) and outputs the digital signal to the signal processor 120.

Then, the signal processor 120 analyzes the digital signal (pulse wave) to obtain a frequency $f_1$ of the digital signal and determines whether the frequency $f_1$ is smaller than a resonance frequency $f_2$ of the LRA 110 (step S11).

Thereafter, the signal processor 120 performs the same processing as the processing of the first embodiment in steps S12-S14.

In the tactile sensation providing apparatus 200, when a frequency $f_1$ of a pulse wave obtained from AD conversion by the AD converter 260 is greater than or equal to the resonance frequency $f_2$ of the LRA 110, as described above, a frequency of vibration of the LRA 110 is substantially equal to the frequency $f_1$. Thus, tactile sensation provided by vibration of the LRA 110 is not likely to include noise.

When a frequency $f_1$ of a pulse wave obtained from AD conversion by the AD converter 260 is smaller than the resonance frequency $f_2$ of the LRA 110, a frequency of a pulse wave provided to the LRA 110 is left unchanged from the frequency $f_1$, and the pulse width t is $\frac{1}{2}f_2$, as depicted in FIG. 4. Therefore, a vibration occurring due to a fall of the pulse wave is continuous from a vibration occurring due to a rise of the pulse wave, and a frequency of vibration of the LRA 110 is substantially equal to the frequency $f_1$. Thus, also in this case, tactile sensation provided by vibration of the LRA 110 is not likely to include noise.

Thus, according to the second embodiment, even when a frequency of vibration is low, noise generated in tactile sensation can be reduced.

Examples of the tactile sensation providing apparatus 200 using an analog signal as an input signal include an apparatus receiving an analog audio signal or the like and generating vibration, for example, a game controller performing analog communication with a main body of a game machine. The tactile sensation providing apparatus 200 can also be used in a vibratable seat and the like for performing analog communication with an apparatus generating an analog audio signal from movie audio data.

Third Embodiment

Figure 7:
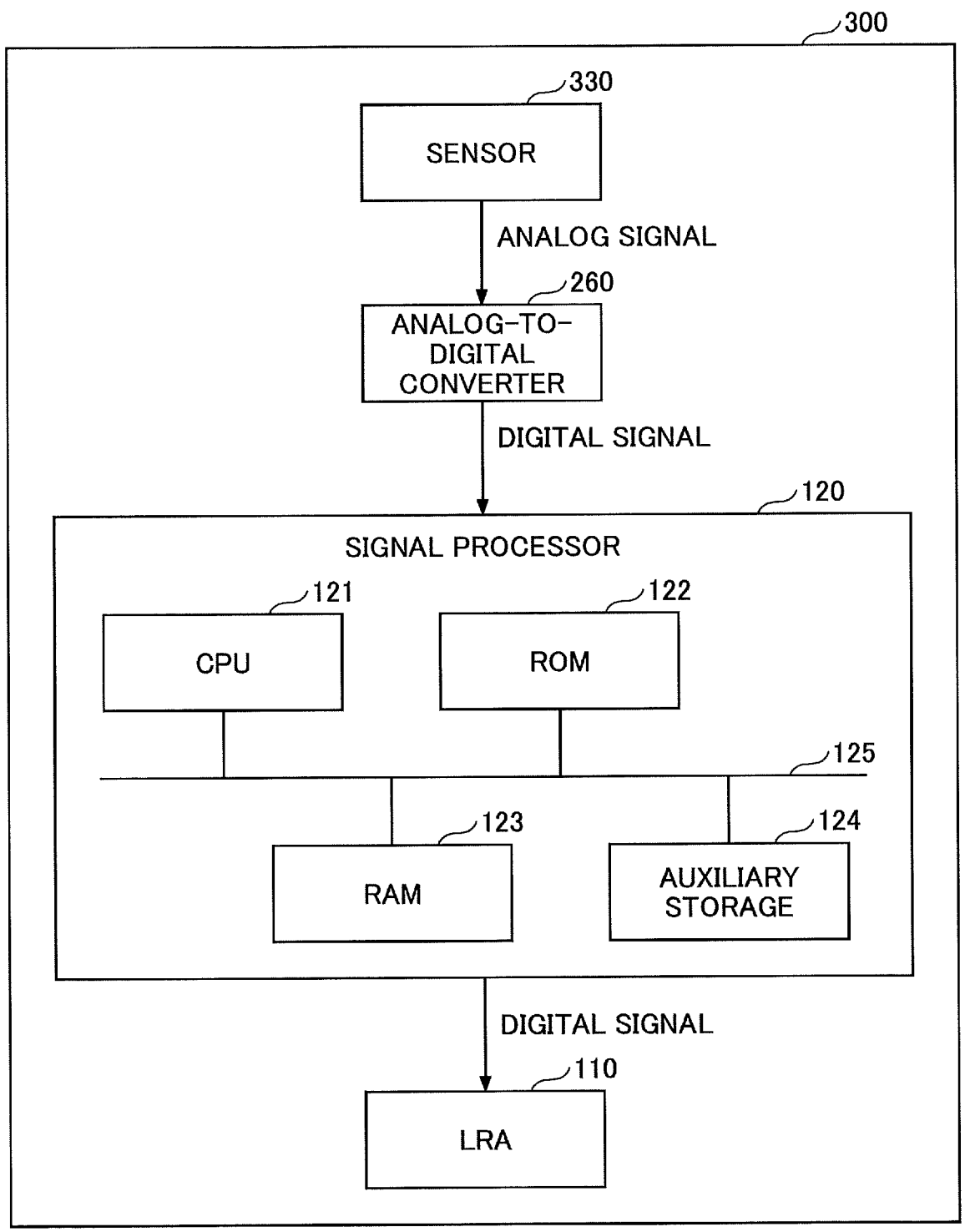
FIG. 7 is a block diagram illustrating a tactile sensation providing apparatus according to a third embodiment.

A third embodiment relates to a tactile sensation providing apparatus including a sensor. FIG. 7 is a block diagram illustrating a tactile sensation providing apparatus according to the third embodiment.

As depicted in FIG. 7, the tactile sensation providing apparatus 300 according to the third embodiment includes a LRA 110, a signal processor 120, an AD converter 260, and a sensor 330.

The sensor 330 detects environmental information and outputs an analog signal to the AD converter 260. The sensor 330 is, for example, a microphone that detects ambient sound, i.e., vibration of air, with respect to the tactile sensation providing apparatus 300, and outputs an analog signal. The sensor 330 is, for example, an acceleration sensor that detects acceleration of the tactile sensation providing apparatus 300 and outputs an analog signal. The sensor 330 is an example of a detector.

The configuration of the LRA 110 and the signal processor 120 is the same as or similar to that of the first embodiment.

In the third embodiment, an analog signal is not provided to the AD converter 260 from the outside of the tactile sensation providing apparatus 300, but is provided to the AD converter 260 from the sensor 330 provided in the tactile sensation providing apparatus 300. As is the same as or similar to the second embodiment, in step S21, the AD converter 260 converts the analog signal to a digital signal (pulse wave), and, in steps S11-S14, the signal processor 120 performs the same processing as the processing of the first embodiment.

Thus, in the tactile sensation providing apparatus 300, when a frequency $f_1$ of a pulse wave obtained from AD conversion by the AD converter 260 is greater than or equal to the resonance frequency $f_2$ of the LRA 110, as described above, a frequency of vibration of the LRA 110 is substantially equal to the frequency $f_1$. Thus, tactile sensation provided by vibration of the LRA 110 is not likely to include noise.

When a frequency $f_1$ of a pulse wave obtained from AD conversion by the AD converter 260 is smaller than the resonance frequency $f_2$ of the LRA 110, a frequency of a pulse wave provided to the LRA 110 is left unchanged from as the frequency $f_1$, and a pulse width t is $\frac{1}{2}f_2$, as depicted in FIG. 4. Thus, a vibration occurring due to a fall of the pulse wave is continuous from a vibration occurring due to a rise of the pulse wave, and a frequency of vibration of the LRA 110 is substantially equal to the frequency $f_1$. Thus, also in this case, tactile sensation provided by vibration of the LRA 110 is not likely to include noise.

Thus, according to the third embodiment, even when a frequency of vibration is low, noise generated in tactile sensation can be reduced.

The tactile sensation providing apparatus 300 with the sensor 330 may be used in an apparatus for detecting ambient sound and generating vibration, such as a vibratable seat with a microphone that detects sound that is in a theater or stadium.

Fourth Embodiment

Figure 8:
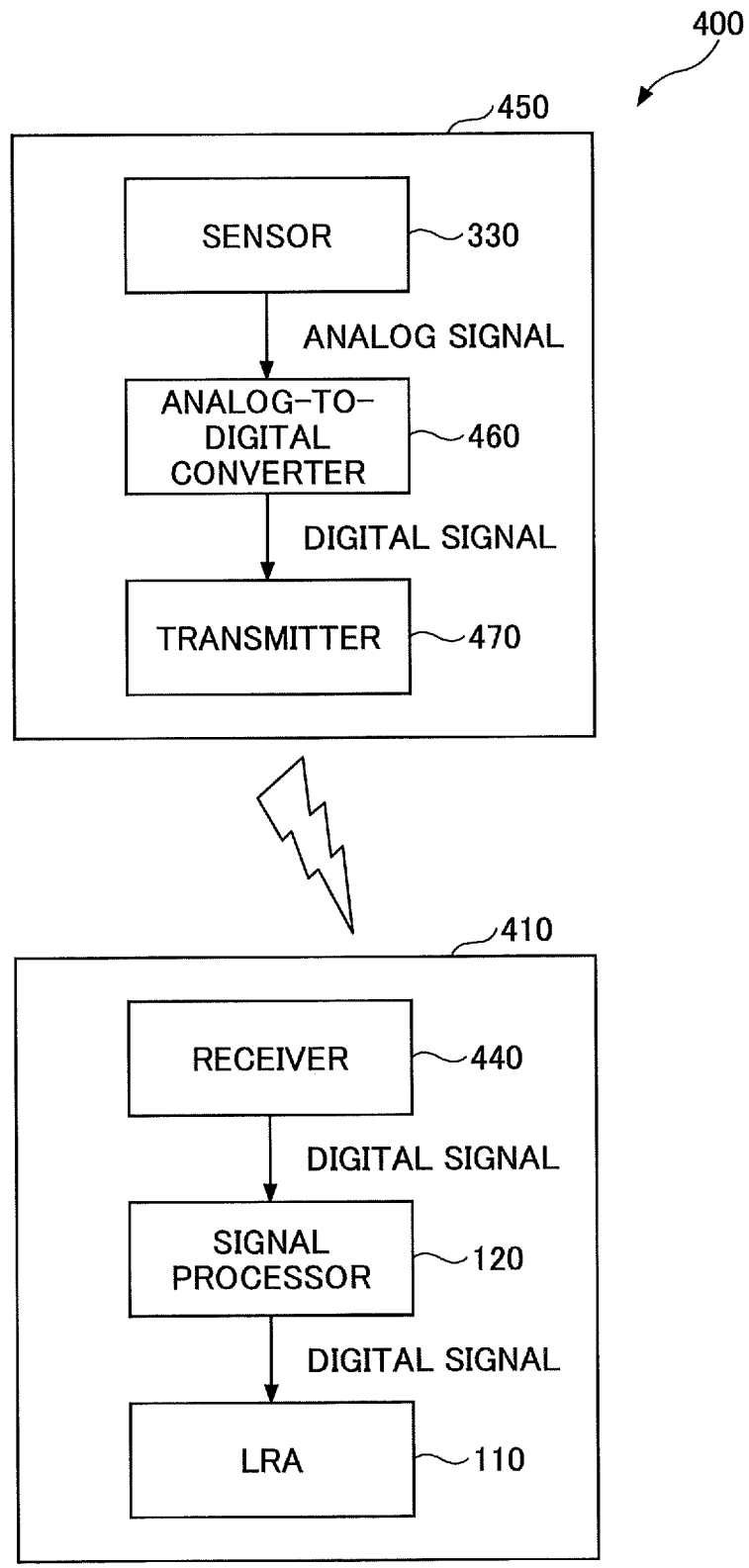
FIG. 8 is a block diagram depicting a tactile sensation providing system according to a fourth embodiment.

A fourth embodiment relates to a tactile sensation providing system including a tactile sensation providing apparatus; and a detector that communicates with the tactile sensation providing apparatus and transmits a digital signal to the tactile sensation providing apparatus. FIG. 8 is a block diagram illustrating the tactile sensation providing system according to the fourth embodiment.

As depicted in FIG. 8, the tactile sensation providing system 400 according to the fourth embodiment includes a tactile sensation providing apparatus 410 and a detector 450. The tactile sensation providing apparatus 410 and the detector 450 communicate with one another. The communicating may be wireless or wire communication.

The detector 450 includes a sensor 330, an AD converter 460, and a transmitter 470. The sensor 330 detects environmental information with respect to the detector 450 to generate an analog signal. The AD converter 460 converts the analog signal generated by the sensor 330 into a digital signal. The transmitter 470 transmits the digital signal output by the AD converter 460 to the tactile sensation providing apparatus 410.

The tactile sensation providing apparatus 410 includes a LRA 110, a signal processor 120, and a receiver 440. The receiver 440 receives the digital signal transmitted by the transmitter 470 of the detector 450 and provides the digital signal to the signal processor 120.

In the detector 450, an analog signal is generated by the sensor 330, the analog signal is converted to a digital signal by the AD converter 460, and the digital signal is transmitted by the transmitter 470.

The digital signal transmitted by the transmitter 470 is received by the receiver 440 of the tactile sensation providing apparatus 410. The signal processor 120 performs processing the same as or similar to the processing performed by the first embodiment, in steps S11-S14.

Therefore, in the tactile sensation providing apparatus 410, when a frequency $f_1$ of a pulse wave obtained from AD conversion by the AD converter 460 is greater than or equal to a resonance frequency $f_2$ of the LRA 110, as described above, a frequency of vibration of the LRA 110 is substantially equal to the frequency $f_1$. Thus, tactile sensation provided by vibration of the LRA 110 is not likely to include noise.

When a frequency $f_1$ of a pulse wave obtained from AD conversion by the AD converter 460 is smaller than the resonance frequency $f_2$ of the LRA 110, a frequency of a pulse wave provided to the LRA 110 is left unchanged from the frequency $f_1$, and the pulse width t is $\frac{1}{2}f_2$, as depicted in FIG. 4. Therefore, a vibration occurring due to a fall of the pulse wave is continuous from a vibration occurring due to a rise of the pulse wave, and a frequency of vibration of the LRA 110 is substantially equal to the frequency $f_1$. Thus, also in this case, tactile sensation provided by vibration of the LRA 110 is not likely to include noise.

Thus, also according to the fourth embodiment, even when a frequency of vibration is low, noise generated in tactile sensation can be reduced.

Further, according to the tactile sensation providing system 400, the detector 450 can be used at a location remote from the tactile sensation providing apparatus 410, and a vibration based on environmental information collected by the detector 450 can be provided by the tactile sensation providing apparatus 410. For example, because tactile sensation can be approximated by a function that uses an acceleration, tactile sensation, detected by the detector 450 with the use of an acceleration sensor as the sensor 330, can be reproduced by the tactile sensation providing apparatus 410 provided at a location away from the detector 450. For example, as a result of a vibration of a patient being detected by the detector 450 and the detected vibration being reproduced by the tactile sensation providing apparatus 410, a doctor can palpate the remote patient.

An analog signal may be transmitted from the detector 450 without having been converted into a digital signal, and then, the analog signal may be converted into a digital signal by the tactile sensation providing apparatus 410. That is, an AD converter 260 may be provided between the receiver 440 and the signal processor 120, and the AD converter 460 of the detector 450 may be omitted.

The signal processor 120 may be provided between the AD converter 460 and the transmitter 470, and transmit a pulse wave processed by the signal processor 120 through processing of FIG. 3 to the tactile sensation providing apparatus 410. In this case, the configuration of the tactile sensation providing apparatus 410 can be simplified.

Figure 9:
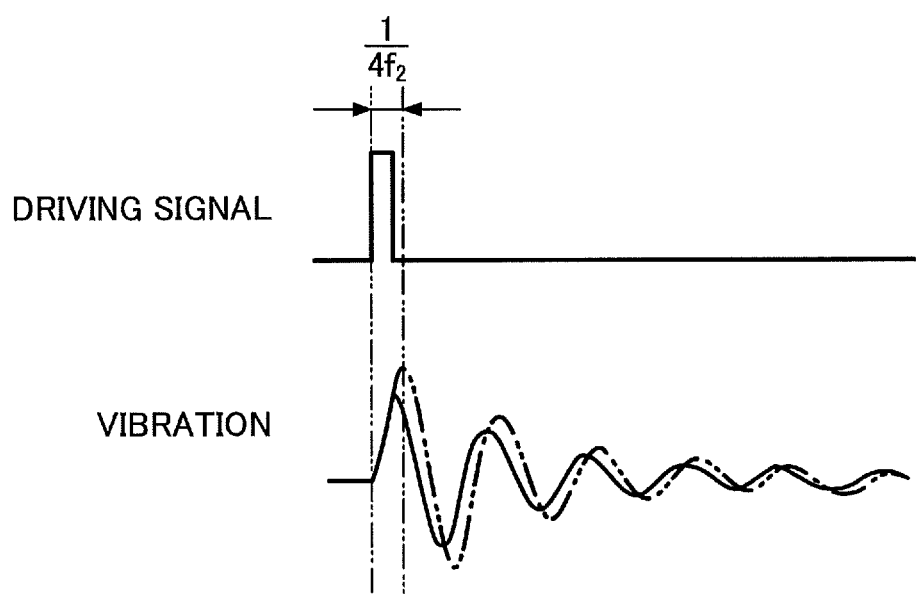
FIG. 9 is a view depicting vibration when a pulse width of a pulse wave is smaller than one-fourth of a resonance frequency.

It should be noted that, in the present disclosure, when a frequency $f_1$ of a pulse wave is smaller than the resonance frequency $f_2$ of the LRA 110, it is not necessary to make a pulse width t of the pulse wave to be exactly equal to $\frac{1}{2}f_2$. For example, when a pulse width t of the pulse wave is smaller than $\frac{1}{2}f_1$, a duty ratio of the pulse wave is smaller than 50%, and a period of time from a rise to a fall of the pulse wave is shorter than a period of time from a fall to a next rise of the pulse wave, resulting in that noise can be reduced. In addition, also when a pulse width t of a pulse wave is smaller than $\frac{1}{2}f_2$, because a vibration occurring due to a fall of the pulse wave is continuous from a vibration occurring due to a rise of the pulse wave, noise can be reduced, as when a pulse width t of the pulse wave is equal to $\frac{1}{2}f_2$. However, when a pulse width t of the pulse wave is smaller than $\frac{1}{4}f_2$, a reverse vibration occurring due to a fall of the pulse wave occurs before the amplitude of a vibration occurring due to a rise of the pulse wave peaks, as depicted in FIG. 9. Thus, a vibration occurring due to a rise of the pulse wave can be damped by a vibration occurring due to a fall of the pulse wave. Therefore, it is preferable that a pulse width t of the pulse wave be greater than or equal to $\frac{1}{4}f_2$ and smaller than or equal to $\frac{1}{2}f_2$.

For example, as a result of the CPU 121 executing a program stored in the auxiliary storage 124, the operations of the tactile sensation providing apparatus according to each of the above-described embodiments are implemented, and the control method according to each of the embodiments is performed.

Although the tactile sensation providing apparatuses, tactile sensation providing systems, control methods, and non-transitory recording media have been described with reference to the embodiments, the present invention is not limited to the embodiments. Various modifications and/or improvements can be made within the scope of the present invention.

What is claimed is:

1. A tactile sensation providing apparatus, comprising:
   a linear resonant actuator; and
   circuitry configured to provide a pulse wave to the linear resonant actuator as a driving signal,
   wherein
   the circuitry is further configured to, when a signal frequency (f1) of the pulse wave is smaller than a resonance frequency (f2) of the linear resonant actuator, set a pulse width (t) of the pulse wave at a value smaller than or equal to a half of a reciprocal of the resonance frequency (f2).

2. The tactile sensation providing apparatus as claimed in claim 1,
   wherein
   the circuitry is further configured to, when the signal frequency (f1) of the pulse wave is smaller than the resonance frequency (f2) of the linear resonant actuator, set the pulse width (t) of the pulse wave at a value greater than or equal to a quarter of the reciprocal of the resonance frequency (f2) and smaller than or equal to the half of the reciprocal of the resonance frequency (f2).

3. The tactile sensation providing apparatus as claimed in claim 1,
   wherein
   the circuitry is further configured to, when the signal frequency (f1) of the pulse wave is greater than or equal to the resonance frequency (f2) of the linear resonant actuator, set the pulse width (t) of the pulse wave at the half of the reciprocal of the signal frequency (f1) of the pulse wave.

4. The tactile sensation providing apparatus as claimed in claim 1, comprising
   a converter converting an input analog signal into the pulse wave that is a digital signal and outputting the pulse wave to the circuitry.

5. The tactile sensation providing apparatus as claimed in claim 4, comprising
   a detector generating an analog signal from environmental information and outputting the analog signal to the converter.

6. The tactile sensation providing apparatus as claimed in claim 5,
   wherein
   the detector detects a vibration and generates the analog signal from the vibration.

7. A tactile sensation providing system comprising:
a linear resonant actuator;
a detector generating an analog signal from environmental information;
a converter converting the analog signal into a pulse wave that is a digital signal; and
circuitry configured to provide the pulse wave to the linear resonant actuator as a driving signal,
wherein
the circuitry is further configured to, when a signal frequency (f1) of the pulse wave is smaller than a resonance frequency (f2) of the linear resonant actuator, set a pulse width (t) of the pulse wave at a value smaller or equal to a half of a reciprocal of the resonance frequency (f2).

8. The tactile sensation providing system as claimed in claim 7,
wherein
the circuitry is further configured to, when the signal frequency (f1) of the pulse wave is smaller than the resonance frequency (f2) of the linear resonant actuator, set the pulse width (t) of the pulse wave at a value greater than or equal to a quarter of the reciprocal of the resonance frequency (f2) and smaller than or equal to the half of the reciprocal of the resonance frequency (f2).

9. The tactile sensation providing system as claimed in claim 7,
wherein
the detector detects a vibration and generates the analog signal from the vibration.

10. A control method of controlling a tactile sensation providing apparatus having a linear resonant actuator, the control method comprising:

providing, by circuitry, a pulse wave as a driving signal to the linear resonant actuator; and
setting, by the circuitry, when a signal frequency (f1) of the pulse wave is smaller than a resonance frequency (f2) of the linear resonant actuator, a pulse width (t) of the pulse wave at a value smaller than or equal to a half of a reciprocal of the resonance frequency (f2).

11. The control method as claimed in claim 10, comprising
setting, by the circuitry, when the signal frequency (f1) of the pulse wave is smaller than the resonance frequency (f2) of the linear resonant actuator, the pulse width (t) of the pulse wave at a value greater than or equal to a quarter of the reciprocal of the resonance frequency (f2) and smaller than or equal to the half of the reciprocal of the resonance frequency (f2).

12. A non-transitory recording medium storing a program, which, when executed by a computer, causes the computer to execute the control method claimed in claim 10.

13. The non-transitory recording medium as claimed in claim 12,
wherein
when executed by the computer, the program further causes the computer to, when the signal frequency (f1) of the pulse wave is smaller than the resonance frequency (f2) of the linear resonant actuator, set the pulse width (t) of the pulse wave at a value greater than or equal to a quarter of the reciprocal of the resonance frequency (f2) and smaller than or equal to the half of the reciprocal of the resonance frequency (f2).

* * * * *